(12) United States Patent
Koskela et al.

(10) Patent No.: US 10,841,816 B2
(45) Date of Patent: Nov. 17, 2020

(54) CONFIGURATION OF FAILURE DETECTION REFERENCE SIGNALS

(71) Applicant: Nokia Technologies Oy, Espoo (FI)

(72) Inventors: Timo Koskela, Oulu (FI); Samuli Turtinen, Ii (FI); Dawid Koziol, Glogow (PL); Jorma Kaikkonen, Oulu (FI); Mihai Enescu, Espoo (FI); Sami Hakola, Kempele (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 16/374,075

(22) Filed: Apr. 3, 2019

(65) Prior Publication Data

US 2019/0320333 A1 Oct. 17, 2019

Related U.S. Application Data

(60) Provisional application No. 62/657,125, filed on Apr. 13, 2018.

(51) Int. Cl.
*H04W 24/04* (2009.01)
*H04W 36/30* (2009.01)
*H04W 72/04* (2009.01)

(52) U.S. Cl.
CPC ......... *H04W 24/04* (2013.01); *H04W 36/305* (2018.08); *H04W 72/042* (2013.01)

(58) Field of Classification Search
CPC .. H04W 24/04; H04W 36/305; H04W 72/042
See application file for complete search history.

(56) References Cited

U.S. PATENT DOCUMENTS

2019/0274169 A1* 9/2019 Tsai ................. H04W 74/0833

FOREIGN PATENT DOCUMENTS

CN 102938934 B 3/2018
WO 2011/099715 A2 8/2011

OTHER PUBLICATIONS

Extended European Search Report received for corresponding European Patent Application No. 19169045.2, dated dated Sep. 6, 2019, 7 pages.
"Summary of Remaining Issues on Beam Failure Recovery", 3GPP TSG RAN WG 1 Meeting #92bis, R1-1803637, Agenda : 7.1.2.2.4, Huawei, Apr. 16-20, 2018, 8 pages.
"3rd Generation Partnership Project; Technical Specification Group Radio Access Network; NR; Radio Resource Control (RRC) protocol specification (Release 15)", 3GPP TS 38.331, V15.1.0 , Mar. 2018, pp. 1-268.
"3rd Generation Partnership Project; Technical Specification Group Radio Access Network; NR; Physical layer procedures for control (Release 15)", 3GPP TS 38.213, V15.0.0, Dec. 2017, pp. 1-56.
"Summary of QCL", 3GPP TSG-RAN Working Group 1 meeting #90bis, R1-171xxxx, Agenda: 7.2.3.7, Nokia, Oct. 9-13, 2017, 21 pages.

(Continued)

*Primary Examiner* — Wayne H Cai
(74) *Attorney, Agent, or Firm* — Squire Patton Boggs (US) LLP (57) ABSTRACT

Systems, methods, apparatuses, and computer program products for the configuration of beam failure detection reference signals are provided.

17 Claims, 7 Drawing Sheets

(56) References Cited

OTHER PUBLICATIONS

"Summary of Discussion for NR Radio Link Monitoring", 3GPP TSG-RAN Working Group 1 meeting #92, R1-1803353, Agenda: 7.1.1.5.2, Intel Corporation, Feb. 26-Mar. 2, 2018, pp. 1-7.
"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 9)", 3GPP TS 36.300, V9.5.0, Sep. 2010, pp. 1-172.
European Office Action corresponding to EP Appln. No. 19 169 045.2, dated Apr. 9, 2020.
Ericsson, "On beam indication, measurement, and reporting", 3GPP TSG-RAN WG1 #90bis, Prague, Czech Republic, Oct. 9-13, 2017, R1-1718433, 9 pages.
Samsung, "On Beam Indication", 3GPP TSG RAN WG1 Meeting 90bis, Prague, Czech Republic, Oct. 9-13, 2017, R1-1717627, 9 pages.

\* cited by examiner

| TCI index | Source RS set | Source RS index | QCL type |
|---|---|---|---|
| 0 | RS set #A | SS/PBCH block #n (of set #A) | A+D |
| 1 | RS set #B | TRS #b (of set (#B) | A |
| | | CSI-RS #c (of set #B) | D |
| ... | ... | ... | ... |
| M-1 | RS set #E | CSI-RS #b (of set #E) | A+D |

RadioLinkMonitoringConfig information element

```
-- ASN1START
-- TAG-RADIOLINKMONITORINGCONFIG-START

RadioLinkMonitoringConfig ::=           SEQUENCE {
    -- A list of reference signals for detecting beam failure and/or cell level
radio link failure (RLF).
    -- The network configures at most two detectionResources per BWP for the
purpose "beamFailure" or "both".
    -- If no RSs are provided for the purpose of beam failure detection, the UE
performs beam monitoring based on the activated TCI-State
    -- for PDCCH. However, if the activated TCI state refers to an aperiodic or
semi-persistent CSI-RS, the gNB configures the failure
    -- detection resources explicitly (FFS RAN1: TBC by RAN1).
    -- If no RSs are provided in this list at all (neither for Cell- nor for
Beam-RLM), the UE performs also Cell-RLM based
    -- on the activated TCI-State of PDCCH (FFS RAN1: TBC by RAN1).
    -- When the network reconfigures this field, the UE resets on-going RLF
timers and counters.
    failureDetectionResources    SEQUENCE(SIZE(1..maxNrofFailureDetectionResources))
OF RadioLinkMonitoringRS    OPTIONAL,         -- Need M -- If this field is set to "true" the configured failureDetectionResources are
used only in case UE's active TCI state referes to non-periodic CSI-RS (i.e.
refers to either aperiodic or semi-persistent CSI-RS)
    applyIfNonPeriodicTCI-StateActive       BOOLEAN,
```

```
-- If this field is set to "true" the configured failureDetectionResources for
beam failure, RLF or both are used only in case UE's active TCI state refers to
non-periodic CSI-RS (i.e. refers to either aperiodic or semi-persistent CSI-RS).
If not present, UE always applies explicit RS configuration for beam failure and
RLF.
    applyIfNonPeriodicTCI-StateActive      ENUMERATED {beamFailure, rlf, both},
OPTIONAL -NEED S -- This field determines after how many beam failure events the UE triggers beam
failure recovery (see 38.321, section 5.17).
-- Value n1 corresponds to 1 beam failure instance, n2 corresponds to 2 beam
failure instances and so on.
-- When the network reconfigures this field, the UE resets on-going RLF
timers and counters.
-- If the field is absent, the UE does not trigger beam failure recovery.
    beamFailureInstanceMaxCount      ENUMERATED {n1, n2, n3, n4, n5, n6, n8, n10}
                  OPTIONAL, -- Need S -- Timer for beam failure detection (see 38.321, section FFS_Section). See
also the BeamFailureRecoveryConfig IE.
-- Value in number of "periods of Beam Failure Detection" Reference Signal.
Value pbfd1 corresponds to 1 period of Beam Failure Detection Reference Signal, value pbfd2 corresponds to 2 periods of Beam
Failure Detection Reference Signal and so on.
-- When the network reconfigures this field, the UE resets on-going RLF
timers and counters.
    beamFailureDetectionTimer      ENUMERATED {pbfd1, pbfd2, pbfd3, pbfd4,
pbfd5, pbfd6, pbfd8, pbfd10}           OPTIONAL, -- Need R
...
}
```

```
RadioLinkMonitoringRS ::=        SEQUENCE {
    -- Determines whether the UE shall monitor the associated reference signal
for the purpose of cell- and/or beam failure detection.
    purpose                      ENUMERATED {beamFailure, rlf, both},
    -- A reference signal that the UE shall use for radio link monitoring. The
network provides an ssb-Index only if
    -- the purpose is set to rlf.
    detectionResource            CHOICE {
        ssb-Index                    SSB-Index,
        csi-RS-Index                 NZP-CSI-RS-ResourceId
    },
    -- if this field is set to "true" the configured RadioLinkMonitoringRS is
used only in case UE's active TCI state referes to non-periodic CSI-RS (i.e.
refers to either aperiodic or semi-persistent CSI-RS)
    applyIfNonPeriodicTCI-StateActive    BOOLEAN,
    ...
}

-- TAG-RADIOLINKMONITORINGCONFIG-STOP
-- ASN1STOP
```

CONFIGURATION OF FAILURE DETECTION REFERENCE SIGNALS

CROSS REFERENCE TO RELATED APPLICATIONS

This application claims priority from U.S. Provisional Application No. 62/657,125, filed on Apr. 13, 2018. The entire contents of this earlier filed application are hereby incorporated by reference in their entirety.

FIELD

Some example embodiments may generally relate to mobile or wireless telecommunication systems, such as Long Term Evolution (LTE) or fifth generation (5G) radio access technology or new radio (NR) access technology. For example, certain embodiments may relate to the configuration of reference signals for beam failure detection in such communication systems.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), LTE-A Pro, and/or fifth generation (5G) radio access technology or new radio (NR) access technology. Fifth generation (5G) or new radio (NR) wireless systems refer to the next generation (NG) of radio systems and network architecture. It is estimated that NR will provide bitrates on the order of 10-20 Gbit/s or higher, and will support at least enhanced mobile broadband (eMBB) and ultra-reliable low-latency-communication (URLLC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. It is noted that, in 5G or NR, the nodes that can provide radio access functionality to a user equipment (i.e., similar to Node B in E-UTRAN or eNB in LTE) may be referred to as a next generation or 5G Node B (gNB).

BRIEF DESCRIPTION OF THE DRAWINGS

For proper understanding of example embodiments, reference should be made to the accompanying drawings, wherein.

SUMMARY

In a first aspect thereof the exemplary embodiments of this invention provide a method that comprises determining, by a user equipment, a quasi co-location source reference signal used for configuring an aperiodic or semi-persistent reference signal; and including the quasi co-location source reference signal in a set of reference signals to use for radio link monitoring or failure detection if the quasi co-location source reference signal is a periodic reference signal, the user equipment is not explicitly provided with the set of reference signals, and a configured transmission configuration index state for physical downlink control channel refers to the aperiodic or semi-persistent reference signal.

In a further aspect thereof the exemplary embodiments of this invention provide an apparatus that comprises at least one data processor and at least one memory that includes computer program code. The at least one memory and computer program code are configured, with the at least one data processor, to cause the apparatus, at least to determine, a quasi co-location source reference signal used for configuring an aperiodic or semi-persistent reference signal; and include the quasi co-location source reference signal in a set of reference signals to use for radio link monitoring or failure detection if the quasi co-location source reference signal is a periodic reference signal, the apparatus is not explicitly provided with the set of reference signals, and a configured transmission configuration index state for physical downlink control channel refers to the aperiodic or semi-persistent reference signal.

In another aspect thereof the exemplary embodiments of this invention provide a computer program product comprising at least one computer-readable storage medium having executable computer-readable program code portions stored therein, the computer-readable program code portions comprising a first program code portion configured to determine a quasi co-location source reference signal used for configuring an aperiodic or semi-persistent reference signal; and a second program code portion configured to include the quasi co-location source reference signal in a set of reference signals to use for radio link monitoring or failure detection if the quasi co-location source reference signal is a periodic reference signal, the computer program product is not explicitly provided with the set of reference signals, and a configured transmission configuration index state for physical downlink control channel refers to the aperiodic or semi-persistent reference signal.

DETAILED DESCRIPTION

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for the configuration of beam failure detection reference signals (RS), is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments.

Additionally, if desired, the different functions or steps discussed below may be performed in a different order and/or concurrently with each other. Furthermore, if desired, one or more of the described functions or steps may be optional or may be combined. As such, the following description should be considered as merely illustrative of the principles and teachings of certain example embodiments, and not in limitation thereof.

In third generation partnership project (3GPP), a beam failure recovery (BFR) procedure is specified to recover a link connection. An aim of the beam failure recovery is to detect when one or multiple serving control channel(s), such as physical downlink control channel (PDCCH), link(s) are considered to be in failure conditions and recovery of the link(s) is needed. To recover the link(s), a UE may initiate signaling towards the network to indicate link failure and/or a new potential candidate link. As a response to requested candidate link, the network may configure the UE with a new PDCCH link. It is noted that beam recovery may also be referred to as link reconfiguration and is specified in 3GPP in technical specifications (TS) 38.213, 38.321 and 38.331.

To perform beam failure detection (BFD), a network can configure UE(s) with a set of reference signals (RS) for monitoring the quality of a link. This set of RS may be referred to as q0 or beam failure detection RS (BFD-RS). Typically, BFD-RS(s) may be configured in a manner such that these signals are spatially quasi co-located (QCLed) with PDCCH demodulation reference signals (DMRS), i.e., so these reference signals may correspond to downlink beams used to transmit PDCCH. As a further example, the different types of quasi co-location parameters may be, e.g., delay spread, Doppler spread, Doppler shift, average delay, and spatial Rx parameters. Downlink beams may be identified by reference signal, for example, either synchronization signal (SS)/physical broadcast channel (PBCH) block index (time location index) or channel state information reference signals (CSI-RS) resource index (or resource set identifier). The network may configure the BFD-RS list using radio resource control (RRC) signaling. It may also be possible to define a way to use combined RRC and medium access control (MAC) control element (CE) signaling to first configure with RRC and then indicate specific resource or set of resources using MAC CE. Both SS/PBCH and/or CSI-RS may be configured as beam failure detection reference signals.

When a UE is not explicitly configured with a BFD-RS list, the UE may determine the BFD-RS resources implicitly based on the configured/indicated/activated PDCCH-transmission configuration indication (TCI) states per control resource set (CORESET), i.e., the downlink reference signals (CSI-RS, SS/PBCH block) that are spatially QCLed with PDCCH DMRS or, in other words, PDCCH beams (UE can assume same spatial transmission characteristics for the RS, e.g., UE can assume same RX beam direction for PDCCH DMRS as for the reference signal with QCL assumption). For the configuration and activation of TCI states for PDCCH, the combined RRC+MAC CE activation of configured TCI states signaling may be used.

Similarly, the following configuration of failure detection RS may also be applicable for radio link monitoring (RLM). RLM-RS can be configured explicitly or implicitly. Both CSI-RS and SS/PBCH block indexes can be included in the RLM-RS list (similar to q0 for beam failure detection). It has been agreed, in 3GPP, that one list of RS(s) is introduced and it is indicated for each whether it is used for beam-RLM/BFD (beam failure detection, i.e., MAC level failure detection) and/or cell RLM (radio link monitoring on cell level, i.e., RRC level failure detection). If no RS(s) are provided for beam monitoring, then the UE performs beam monitoring based on the (active) TCI state for PDCCH. Currently, only one TCI state for PDCCH can be active but it may be possible to operate with multiple active TCI states per TCI table/list. If no RS(s) are provided in the list at all (neither for cell nor for beam RLM), then the UE performs cell RLM based on TCI states of PDCCH.

A common Quasi-colocation (QCL) and Transmit Configuration Indication (TCI) framework may be used for defining a "transmit beam" for different downlink physical signals and channels, such as for periodic, semi-persistent and aperiodic CSI-RS, and NR-PDCCH and NR-PDSCH. As a result, the UE may be configured with a TCI table in which each row/state is associated with one or two RSs that may act as a source RS(s) in terms of different QCL parameters (e.g., delay spread, average delay, doppler spread, doppler shift, spatial RX) for the certain downlink signal. When spatial receiver (RX) QCL parameter is configured for the certain source RS, the UE can assume the same RX beam can be applied when receiving the configured/scheduled/triggered physical signal or physical channel as was used for receiving the source RS.

A UE can be configured with up to 3 CORESETs and together 10 search space sets within a configured bandwidth part (BWP). CORESET defines physical time and frequency resources on which NR-PDCCH can be transmitted. The search space set defines PDCCH monitoring related time domain parameters, such as monitoring periodicity. In other words, search space parameters provide a UE with information for when to try detecting NR-PDCCH from the certain CORESET.

Figure 1:
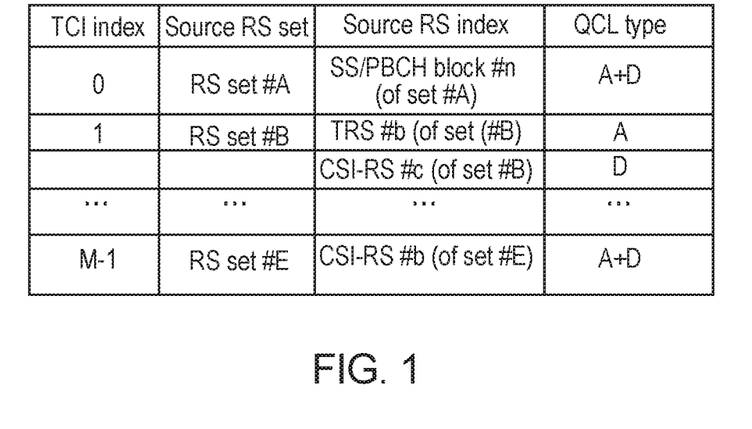
FIG. 1 illustrates an example transmission configuration index (TCI) table configured for a UE.

For determining the transmit beam for the NR-PDCCH, it has been agreed that each CORESET may be associated to one or multiple above-mentioned TCI rows (or TCI states). In case the CORESET is associated with more than one TCI state, MAC-CE level activation signaling may be used to control which one of the multiple TCI states is active at a time per CORESET. Search space set related parameters associated to the CORESET define time domain monitoring pattern from which the UE knows when to monitor a certain CORESET and then, from the associated (active) TCI state of the CORESET, the UE knows how to set its RX beam. FIG. 1 illustrates an example TCI table configured for a UE. In the example of FIG. 1, QCL type A means Doppler spread, Doppler shift, delay spread, and/or average delay, and QCL type D means spatial RX. Thus, when TCI index 0 determines the source RS(s) for a certain physical signal or channel, the UE can determine that it can set its RX beam as it is set for receiving the SS/PBCH block # n. Correspondingly, when TCI index 1 determines the source RS(s) for a certain physical signal or channel, the UE can determine that it can set its RX beam as it is set for receiving the CSI-RS # (of RS set # B).

Figure 2:
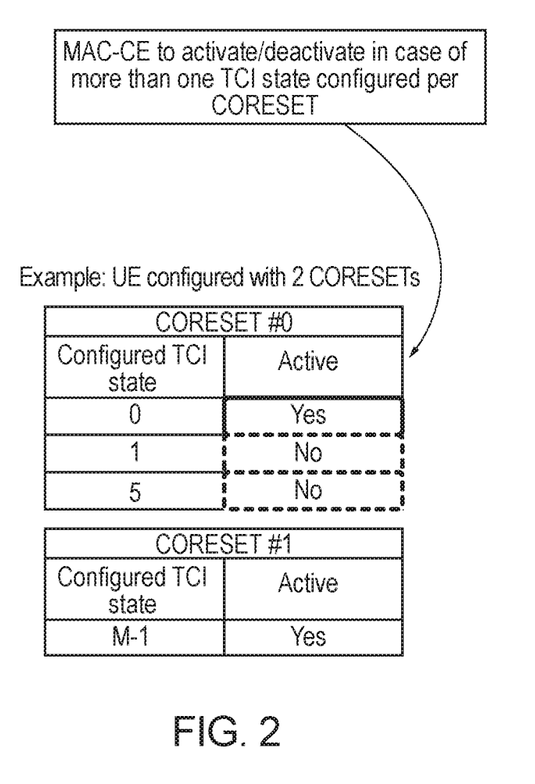
FIG. 2 illustrates an example of a CORESET configuration for a UE configured with two CORESETs.

FIG. 2 illustrates an example of a case where a UE has been configured two CORESETs with one or multiple TCI state associations. As depicted in the example of FIG. 2, for the CORESET #0, MAC-CE signalling may be used to activate one TCI state at a time.

As noted in 3GPP TS 38.331, the RadioLinkMonitoring-Config information element (IE) is used to configure radio link monitoring for detection of beam and/or cell radio link failure. Current specification refers to these resources as RLM-RS, radio link monitoring reference signals, and for each RS the purpose (beam failure detection, radio link failure, or both) can be indicated. When "both" is indicated, the same resource is used for BFD and RLF. Radio link failure detection is part of the Radio Link Monitoring procedure. According to this, the RadioLinkMonitoringConfig IE may include a list of reference signals for detecting beam failure and/or cell level radio link failure (RLF), the network configures at most two detection resources per BWP for the purpose of "beamFailure". In case of radio link failure detection (radio link monitoring), the maximum number of failure detection resources may also be frequency range dependent i.e. below 3 GHz maximum of two resources can be configured (per BWP) whereas between 3-6 GHZ at most 4 and above 6 GHz range at most 8 can be configured. It may also be possible to determine beam failure resources to be frequency range dependent and/or to have same maximum numbers. These can be considered as example numbers. It is further provided that, if no RSs are provided for the purpose of beam failure detection, the UE performs beam monitoring based on the activated TCI-State for PDCCH. In other words, the UE determines the failure detection RS configuration implicitly. However, if the activated TCI state for PDCCH refers to an aperiodic or semi-persistent CSI-RS, the gNB configures the failure detection resources explicitly according to certain embodiments of the present disclosure. If no RSs are provided in this list at all (i.e., neither for Cell nor for Beam-RLM), the UE also performs Cell-RLM based on the activated TCI-State (or states) of PDCCH i.e. using implicit configuration. When the network reconfigures this field, the UE resets on-going RLF timers and counters. It may also be possible to define a mechanism to configure failure detection resources using RRC and MAC layer signaling. A set of RS is configured using RRC and MAC CE (MAC Control element) is used to activate a sub set (or all) resources for failure detection (beam failure, RLF or both).

Thus, in view of the above, it remains an open issue how the UE performs radio link monitoring (and/or beam failure detection) in case the indicated TCI state does not refer to periodic signal since UE L1 (layer 1) is expected to provide periodic indication of radio link quality to higher layers (MAC, RRC) based on the quality of failure detection RS. In the baseline solution, network would need to configure the UE explicitly an RS for failure detection (RLM/BFD) thus overriding any implicit configuration. However, this may be a waste of signalling procedures adding signaling overhead in the case where the UE is frequently configured with CSI-RS of different characteristic (e.g., periodic or aperiodic/semi-persistent), since the explicit configuration requires RRC signalling. Additionally, the RRC signaling can be considered non-optimal from latency point of view. Alternatively, such operation could be done using MAC layer signaling but again this would require additional signaling between UE and network.

Certain example embodiments provide configuration logic to be specified for RLM-RS and BFD-RS configuration when a UE has not been explicitly provided the list of reference signals for failure monitoring. One embodiment provides a UE procedure in case the indicated TCI-State for PDCCH is aperiodic/semi-persistent RS. In an embodiment, if the network activates a TCI state for PDCCH that refers to an aperiodic/semi-persistent (A/S-P) reference signal (CSI-RS), the UE may determine if the current set of failure detection resources include at least one periodic signal or a periodic signal if that is the QCL source RS in the TCI state configured as QCL reference for the indicated AS-P CSI-RS. In one example the QCL reference may be a spatial, but other references are not excluded.

According to one embodiment, if the activated TCI state refers to an aperiodic or semi-persistent CSI-RS, the UE does not include the configured TCI state to the failure detection resources (e.g., RLM-RS or BFD-RS) if at least one periodical RS (e.g., CSI-RS or SS/PBCH or SSB) has already been included in the set of failure detection resources. Additionally or alternatively, in an embodiment, if the activated TCI state refers to an aperiodic or semi-persistent CSI-RS, the UE may determine the QCL source RS used for configuring the aperiodic/SP CSI-RS and, if the QCL source RS is periodic, the UE may include the RS to the failure detection RS set (BFR/RLM). When the TCI state is deactivated, in certain embodiments, the QCL source may be removed from the list in case another periodic RS is already included in the list.

In additional example embodiments, if the network has configured explicit RLM-RS (beam failure detection RS/radio link failure RS detection) due to activation of aperiodic/SP RS and the network activates TCI state that refers to periodic RS (SS/PBCH Blockor CSI-RS) and no other periodic/SP TCI state has been activated, the UE may assume the failure detection RS (again) to be implicitly configured.

In one example embodiment, when the aperiodic/SP CSI-RS TCI state is indicated, UE may assume periodic signal to be always SS/PBCH Block if the SS block is used as original QCL source. In a further example, if the QCL source for the aperiodic/SP CSI-RS is periodic CSI-RS UE would use the SS Block that is QCLed with the periodic CSI-RS.

Figure 5A:
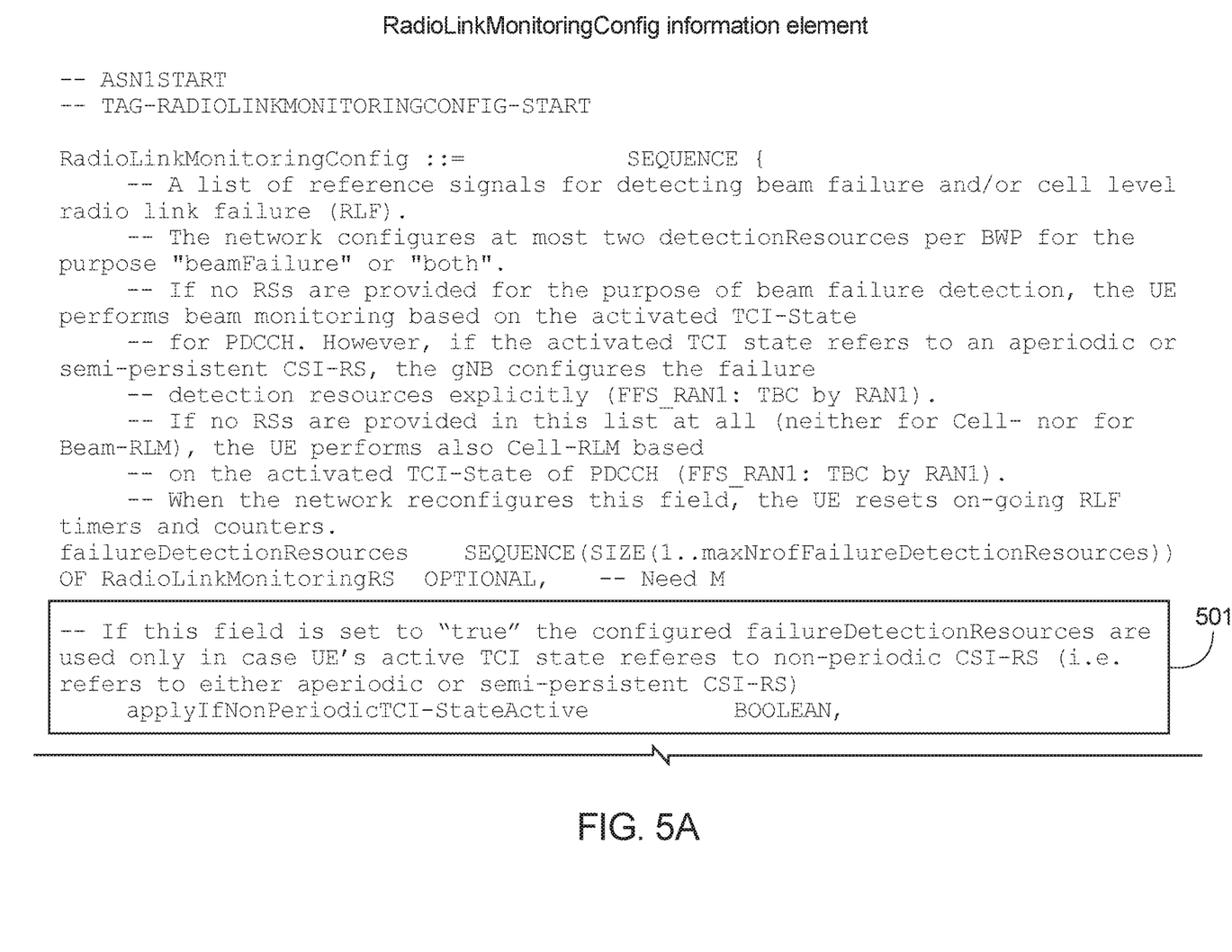
Figure 5C:
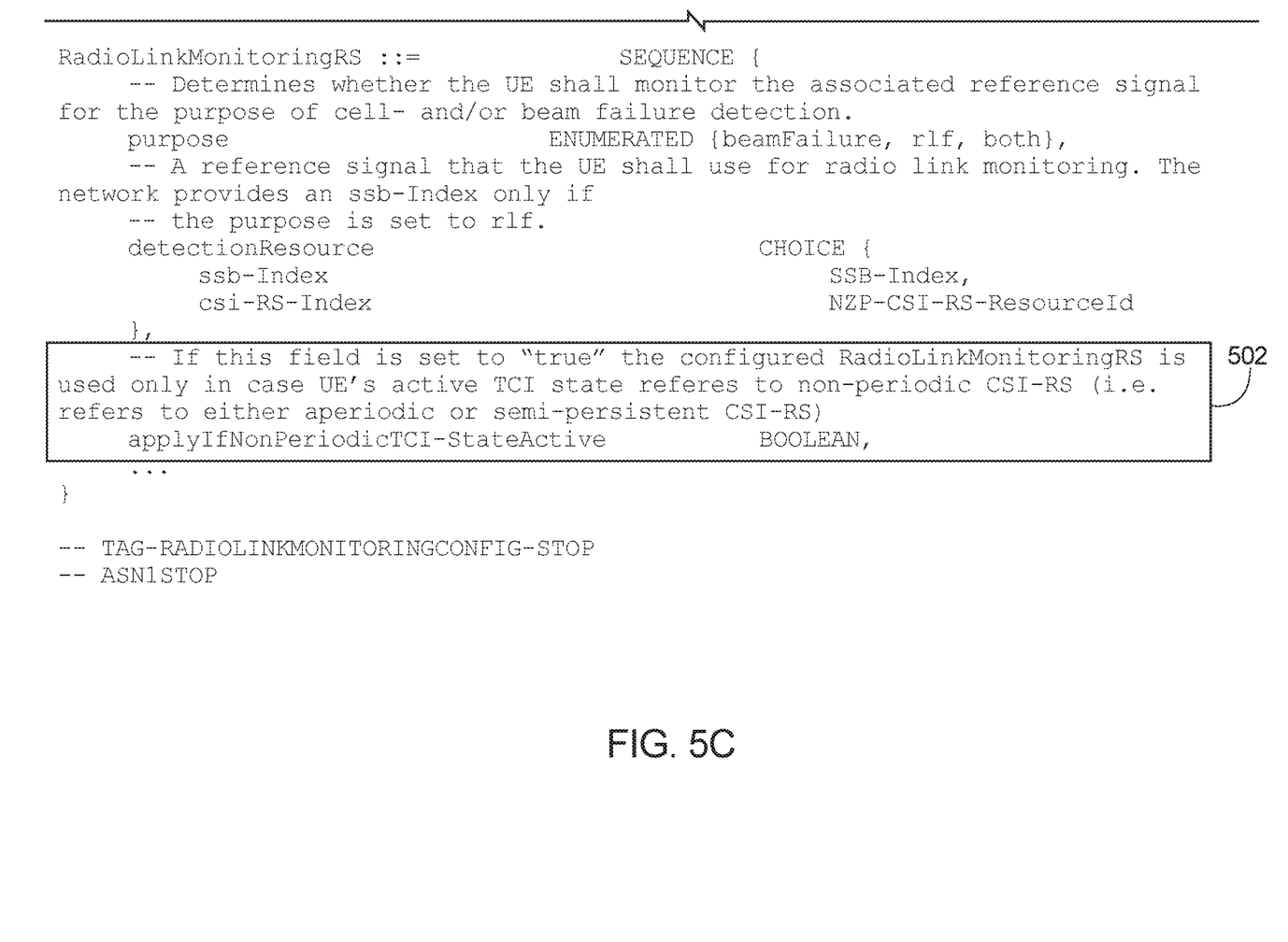
FIG. 5C illustrates an example information element, according to some embodiments.

In additional example embodiments, a parameter may be defined for signaling the switch between explicit or implicit configuration of failure detection RS (RLF/BFD). FIG. 5A, FIG. 5B, and FIG. 5C illustrates an example of a radio link monitoring information element that implements the parameter, according to some embodiments. In one example, FIG. 5A at 501, when the network configures explicitly the failure detection RS list, a parameter is used to indicate if the explicit configuration (RS list) is always applied to radio link monitoring (radio link failure detection) and/or beam failure detection or only applied when no TCI state for indicating non-periodic CSI-RS resource is active. One example implementation may be to have a binary indicator, e.g., a Boolean (true/false) variable to control the use of explicit RS list. If this indicator/field/variable/parameters is set to "true," the configured failure detection resources (failureDetectionResource) are used only in case UE's active TCI state refers to non-periodic CSI-RS (i.e., refers to either aperiodic or semi-persistent CSI-RS). If the variable is set to "false," the configuration applies without above condition.

In yet another additional implementation example embodiment, FIG. 5B at 503, variable/field may be defined as list with values {beamfailure, rlf, both}. If this field is present, the configured failure detection resources for beam failure, RLF (radio link monitoring) or both (depending on the configured value out of the list above) are used only in case UE's active TCI state refers to non-periodic CSI-RS (i.e. refers to either aperiodic or semi-persistent CSI-RS). If not present, UE always applies explicit RS configuration for beam failure and/or RLF.

In yet another additional implementation example embodiment, FIG. 5C at 502, the binary indicator, e.g., a Boolean (true/false) variable is applied per failureDetection/

RLM RS. Since UE can be configured per each RLM-RS resource whether is used for beam failure detection, radio link failure detection or for both, having the variable (as Boolean, true/false) to be defined per RLM-RS resource allows the switch between explicit and implicit configuration to be done separately for beam failure detection and radio link failure detection. Or use it for both. This would allow for configuring this separately for RLM and BFD.

Figure 3A:
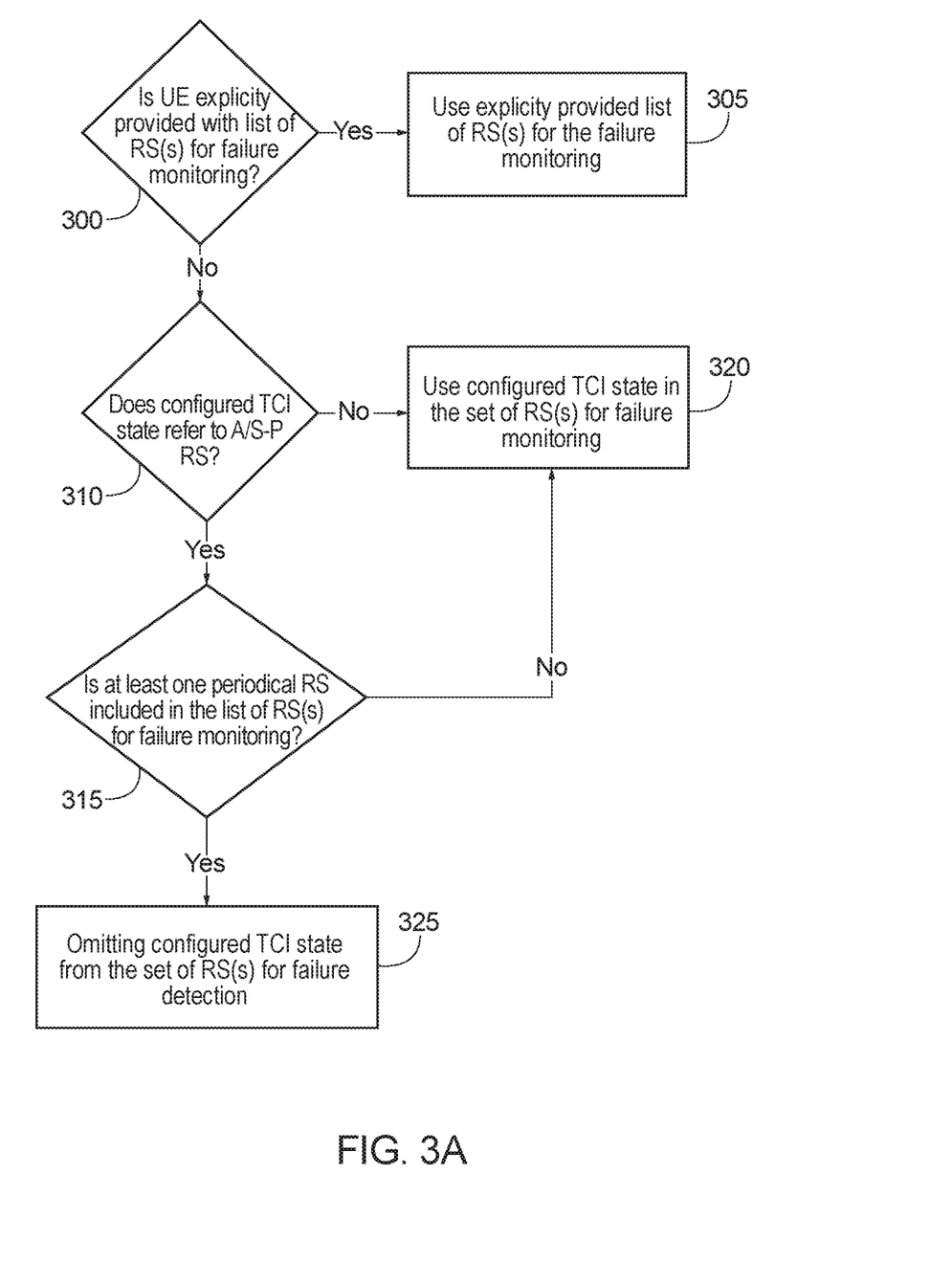
FIG. 3A illustrates an example flow diagram of a method, according to one embodiment.

In one embodiment, the network can reconfigure UE to implicit configuration mode of radio link monitoring RS by configuring explicitly an empty list (failure detection resources, failureDetectionResource/RadioLinkMonitoringRS) or not configuring the list at all. FIG. 3a illustrates an example flow diagram of a method for the configuring of failure detection RS(s), according to an embodiment. In certain embodiments, the method of FIG. 3a may be performed by a UE, mobile station, mobile equipment, IoT device, or the like. As illustrated in the example of FIG. 3a, the method may include, at 300, determining whether the UE is explicitly provided with a list or set of RS(s) for failure detection or monitoring. For example, in certain embodiments, the failure detection or monitoring may refer to radio link monitoring (RLM) and/or beam failure detection (BFD). If it is determined that the UE is explicitly provided with set of RS(s) for failure detection or monitoring, then the method may include, at 305, using the explicitly provided set of RS(s) for the failure detection or monitoring. If it is determined that the UE is not explicitly provided with set of RS(s) for failure detection or monitoring, then the method may include, at 310, determining whether the activated or configured TCI state for PDCCH refers to aperiodic/semi-persistent RS.

If it is determined that the configured TCI state for PDCCH does not refer to aperiodic/semi-persistent RS, then the method may include, at 320, using the configured TCI state as part of the set of resources for failure detection or monitoring. If it is determined that the configured TCI state for PDCCH refers to aperiodic/semi-persistent RS, then the method may include, at 315, determining whether at least one periodical RS is included in the set of resources for failure detection or monitoring. If it is determined that there is not at least one periodical RS included in the set of resources for failure detection or monitoring, then the method may include, at 320, using the configured TCI state as part of the set of resources for failure detection or monitoring. If it is determined that there is at least one periodical RS included in the set of resources for failure detection or monitoring, then the method may include, at 325, omitting or not including the configured TCI state in the set of resources for failure detection. For example, in an embodiment, the omitting step 325 may include constructing a set of resources for failure monitoring that does not include the configured TCI state. It should be noted that, in certain embodiments, steps 300 and 310 may be performed in any order or simultaneously. In other words, the determination at 300 of whether the UE is explicitly provided with a set of RS(s) for failure detection may be performed before, after or concurrently with the determination at 310 of whether the configured TCI state for PDCCH refers to aperiodic/semi-persistent RS.

Figure 3B:
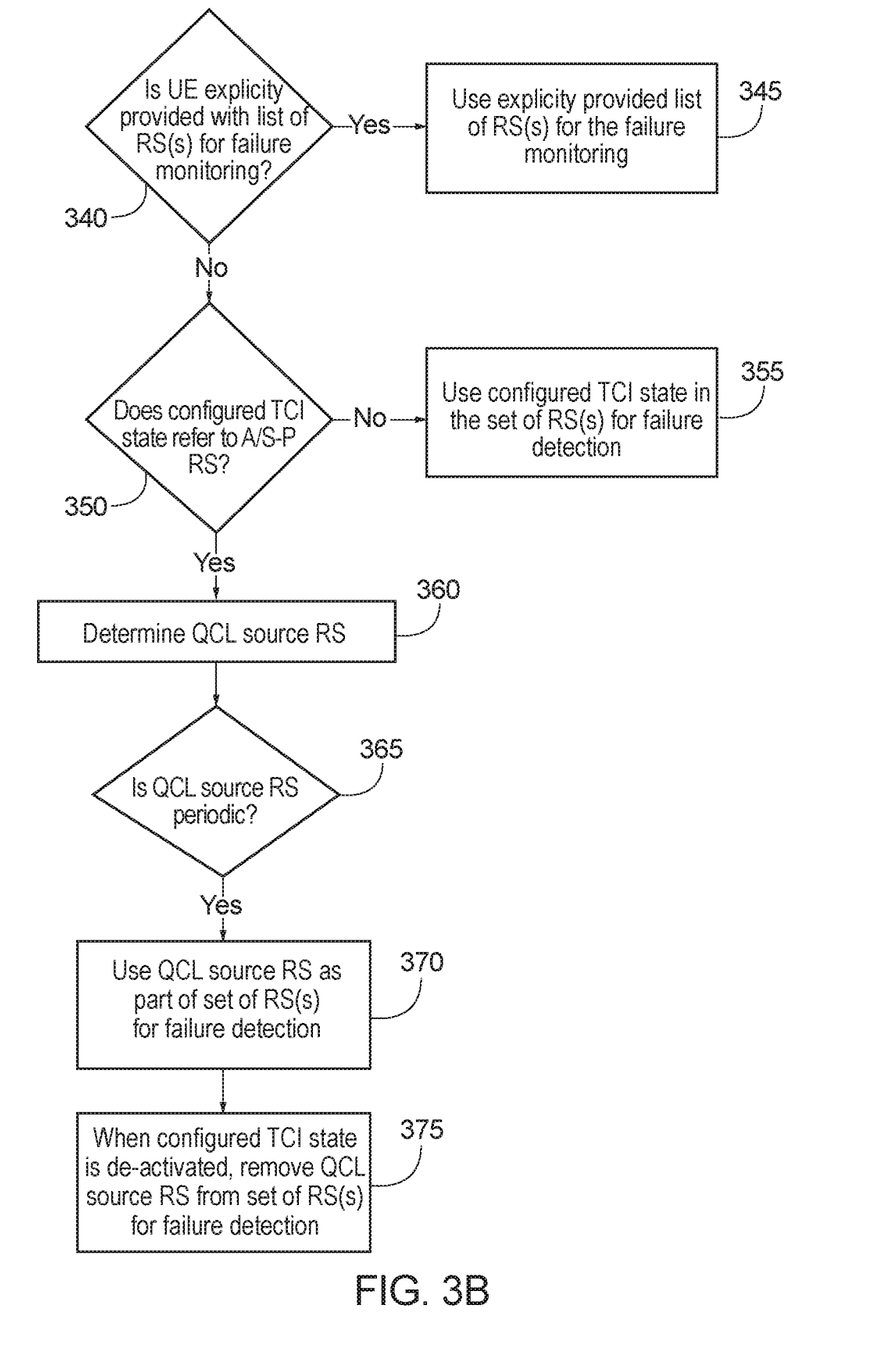
FIG. 3B illustrates an example flow diagram of a method, according to another embodiment.

FIG. 3b illustrates an example flow diagram of a method for the configuring of failure detection RS(s), according to another embodiment. In certain embodiments, the method of FIG. 3b may be performed by a UE, mobile station, mobile equipment, IoT device, or the like. As illustrated in the example of FIG. 3b, the method may include, at 340, determining whether the UE is explicitly provided with a list or set of RS(s) for failure detection or monitoring, such as for RLM and/or BFD. If it is determined that the UE is explicitly provided with set of RS(s) for failure detection or monitoring, then the method may include, at 345, using the explicitly provided set of RS(s) for the failure detection or monitoring. If it is determined that the UE is not explicitly provided with set of RS(s) for failure detection or monitoring, then the method may include, at 350, determining whether the activated or configured TCI state for PDCCH refers to aperiodic/semi-persistent RS.

If it is determined that the configured TCI state for PDCCH does not refer to aperiodic/semi-persistent RS, then the method may include, at 355, using the configured TCI state as part of the set of resources for failure detection or monitoring. If it is determined that the configured TCI state for PDCCH does refer to aperiodic/semi-persistent RS, then the method may include, at 360, determining a QCL source RS used for configuring the aperiodic/semi-persistent RS. The method may then include, at 365, determining whether the QCL source RS is periodic. If it is determined that the QCL source RS is periodic, then the method may include, at 370, using or including the QCL source RS as part of the set of resources for failure detection or monitoring. In an embodiment, the method may also include, at 375, removing the QCL source RS from the set of resources for failure detection when the configured TCI state is de-activated.

It should be noted that the processes depicted in FIGS. 3a and 3b may be performed separately or may be combined in any suitable manner.

Figure 4A:
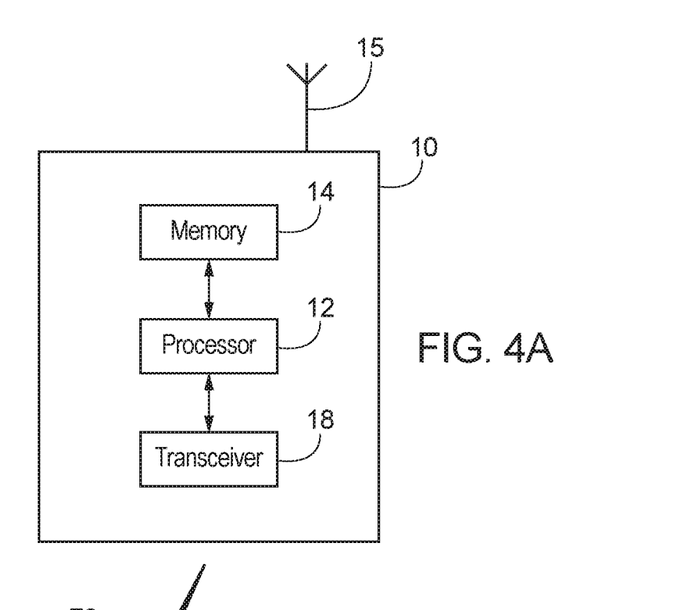
FIG. 4A illustrates an example block diagram of an apparatus, according to one embodiment.

FIG. 4A illustrates an example of an apparatus 10 according to an embodiment. In an embodiment, apparatus 10 may be a node, host, or server in a communications network or serving such a network. For example, apparatus 10 may be a base station, a Node B, an evolved Node B (eNB), 5G Node B or access point, next generation Node B (NG-NB or gNB), WLAN access point, mobility management entity (MME), and/or subscription server associated with a radio access network, such as a GSM network, LTE network, 5G or NR.

It should be understood that, in some example embodiments, apparatus 10 may be comprised of an edge cloud server as a distributed computing system where the server and the radio node may be stand-alone apparatuses communicating with each other via a radio path or via a wired connection, or they may be located in a same entity communicating via a wired connection. For instance, in certain example embodiments where apparatus 10 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a front-haul interface. The DU may be a logical node that includes a subset of the gNB functions, depending on the functional split option. It should be noted that one of ordinary skill in the art would understand that apparatus 10 may include components or features not shown in FIG. 4a.

As illustrated in the example of FIG. 4a, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 4*a*, multiple processors may be utilized according to other embodiments. For example, it should be understood that, in certain embodiments, apparatus 10 may include two or more processors that may form a multiprocessor system (e.g., in this case processor 12 may represent a multiprocessor) that may support multiprocessing. In certain embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to management of communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna (s) 15. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly. Additionally or alternatively, in some embodiments, apparatus 10 may include an input and/or output device (I/O device).

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some embodiments, processor 12 and memory 14 may be included in or may form a part of processing circuitry or control circuitry. In addition, in some embodiments, transceiver 18 may be included in or may form a part of transceiving circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to case an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 10 may be a network node or RAN node, such as a base station, access point, Node B, eNB, gNB, WLAN access point, or the like. According to certain embodiments, apparatus 10 may be controlled by memory 14 and processor 12 to perform the functions associated with any of the embodiments described herein. In certain embodiments, apparatus 10 may be configured to perform a procedure for configuring of resources (RS) for failure detection or monitoring (e.g., for RLM or BFD).

For instance, in one embodiment, apparatus 10 may be controlled by memory 14 and processor 12 to explicitly configure resources for UE(s) for failure detection or monitoring. For example, the resources may include RLM-RS. In an embodiment, apparatus 10 may be controlled by memory 14 and processor 12 to activate a TCI state for PDDCH. The activated TCI state may refer to aperiodic/semi-persistent RS or to periodic RS. According to an embodiment, if apparatus 10 has configured explicit resources (e.g., RLM-RS) due to activation of aperiodic/semi-persistent RS and has activated a TCI state that refers to periodic RS and no other periodic/semi-persistent TCI state has been activated, the UE(s) assume the set of failure detection RS to be implicitly configured.

Figure 4B:
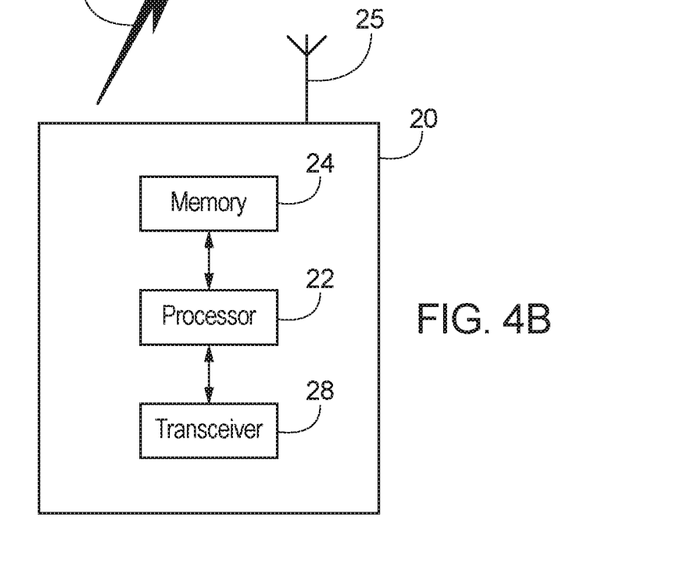
FIG. 4B illustrates an example block diagram of an apparatus, according to another embodiment; and FIG. 5A, FIG. 5B.

FIG. 4B illustrates an example of an apparatus 20 according to another embodiment. In an embodiment, apparatus 20 may be a node or element in a communications network or associated with such a network, such as a UE, mobile equipment (ME), mobile station, mobile device, stationary device, IoT device, or other device. As described herein, UE may alternatively be referred to as, for example, a mobile station, mobile equipment, mobile unit, mobile device, user device, subscriber station, wireless terminal, tablet, smart phone, IoT device or NB-IoT device, or the like. As one example, apparatus 20 may be implemented in, for instance, a wireless handheld device, a wireless plug-in accessory, or the like.

In some example embodiments, apparatus 20 may include one or more processors, one or more computer-readable storage medium (for example, memory, storage, or the like), one or more radio access components (for example, a modem, a transceiver, or the like), and/or a user interface. In some embodiments, apparatus 20 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 20 may include components or features not shown in FIG. 4B.

As illustrated in the example of FIG. 4B, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 4B, multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster).

Processor 22 may perform functions associated with the operation of apparatus 20 including, as some examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Additionally or alternatively, in some embodiments, apparatus 10 may include an input and/or output device (I/O device). In certain embodiments, apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10 via a wireless or wired communications link 70 according to any radio access technology, such as NR.

According to some embodiments, processor 22 and memory 24 may be included in or may form a part of processing circuitry or control circuitry. In addition, in some embodiments, transceiver 28 may be included in or may form a part of transceiving circuitry.

As discussed above, according to some embodiments, apparatus 20 may be a UE, mobile device, mobile station, ME, IoT device and/or NB-IoT device, for example. According to certain embodiments, apparatus 20 may be controlled by memory 24 and processor 22 to perform the functions associated with example embodiments described herein. For example, in some embodiments, apparatus 20 may be configured to perform one or more of the processes depicted in any of the flow charts or signaling diagrams described herein, such as the flow diagrams illustrated in FIG. 3a or 3b.

According to some embodiments, apparatus 20 may be controlled by memory 24 and processor 22 to determine whether the apparatus 20 is explicitly provided with a list or set of RS(s) for failure detection or monitoring. For example, in certain embodiments, the failure detection or monitoring may refer to RLM and/or BFD. If it is determined that the apparatus 20 is explicitly provided with set of RS(s) for failure detection or monitoring, then apparatus 20 may be controlled by memory 24 and processor 22 to use the explicitly provided set of RS(s) for the failure detection or monitoring. If it is determined that the apparatus 20 is not explicitly provided with set of RS(s) for failure detection or monitoring, then apparatus 20 may be controlled by memory 24 and processor 22 to determine whether the activated or configured TCI state for PDCCH refers to aperiodic/semi-persistent RS.

If it is determined that the configured TCI state for PDCCH does not refer to aperiodic/semi-persistent RS, then apparatus 20 may be controlled by memory 24 and processor 22 to use the configured TCI state as part of the set of resources for failure detection or monitoring. If it is determined that the configured TCI state for PDCCH refers to aperiodic/semi-persistent RS, then apparatus 20 may be controlled by memory 24 and processor 22 to determine whether at least one periodical RS is included in the set of resources for failure detection or monitoring. If it is determined that there is not at least one periodical RS included in the set of resources for failure detection or monitoring, then apparatus 20 may be controlled by memory 24 and processor 22 to use the configured TCI state as part of the set of resources for failure detection or monitoring. If it is determined that there is at least one periodical RS included in the set of resources for failure detection or monitoring, then apparatus 20 may be controlled by memory 24 and processor 22 to omit or not include the configured TCI state in the set of resources for failure detection. For example, in an embodiment, apparatus 20 may omit the configured TCI by constructing a set of resources for failure monitoring that does not include the configured TCI state.

In other example embodiments, apparatus 20 may be controlled by memory 24 and processor 22 to determine whether it is explicitly provided with a list or set of RS(s) for failure detection or monitoring, such as for RLM and/or BFD. If it is determined that the apparatus 20 is explicitly provided with set of RS(s) for failure detection or monitoring, then apparatus 20 may be controlled by memory 24 and processor 22 to use the explicitly provided set of RS(s) for the failure detection or monitoring. If it is determined that the apparatus 20 is not explicitly provided with set of RS(s) for failure detection or monitoring, then apparatus 20 may be controlled by memory 24 and processor 22 to determine whether the activated or configured TCI state for PDCCH refers to aperiodic/semi-persistent RS.

If it is determined that the configured TCI state for PDCCH does not refer to aperiodic/semi-persistent RS, then apparatus 20 may be controlled by memory 24 and processor 22 to use the configured TCI state as part of the set of resources for failure detection or monitoring. If it is determined that the configured TCI state for PDCCH does refer to aperiodic/semi-persistent RS, then apparatus 20 may be controlled by memory 24 and processor 22 to determine a QCL source RS used for configuring the aperiodic/semi-persistent RS. In an embodiment, apparatus 20 may also be controlled by memory 24 and processor 22 to determine whether the QCL source RS is periodic. If it is determined that the QCL source RS is periodic, then apparatus 20 may be controlled by memory 24 and processor 22 to use or include the QCL source RS as part of the set of resources for failure detection or monitoring. In one embodiment, apparatus 20 may be controlled by memory 24 and processor 22 to remove the QCL source RS from the set of resources for failure detection when the configured TCI state is deactivated.

According to an embodiment, if the network has configured explicit RS (e.g., RLM-RS) due to activated of a periodic/semi-persistent RS and the network activates a TCI state that refers to periodic RS and no other periodic/semi-persistent RS has been activated, apparatus 20 may be controlled by memory 24 and processor 22 to assume the set of resources for failure detection (again) to be implicitly configured.

Therefore, certain example embodiments provide several technical improvements, enhancements, and/or advantages. Various example embodiments can, for example, provide ways for configuring resource for beam failure detection and/or radio link monitoring. Some example embodiments can reduce signaling overhead since, in the case that the activated TCI state is an aperiodic/semi-persistent signal, the network may not need to explicitly configure failure detection RS via RRC. In addition, according to certain embodiments, the condition to revert back to implicit configuration reduces the signaling overhead of failure detection resource configuration. Consequently, certain example embodiments can reduce overhead and improve the reliability and speed of networks. As such, example embodiments can improve performance, latency, and/or throughput of networks and network nodes including, for example, access points, base stations/eNBs/gNBs, and mobile devices or UEs. Accordingly, the use of certain example embodiments results in improved functioning of communications networks and their nodes.

In some example embodiments, the functionality of any of the methods, processes, signaling diagrams, algorithms or flow charts described herein may be implemented by software and/or computer program code or portions of code stored in memory or other computer readable or tangible media, and executed by a processor.

In some example embodiments, an apparatus may be included or be associated with at least one software application, module, unit or entity configured as arithmetic operation(s), or as a program or portions of it (including an added or updated software routine), executed by at least one operation processor. Programs, also called program products or computer programs, including software routines, applets and macros, may be stored in any apparatus-readable data storage medium and include program instructions to perform particular tasks.

A computer program product may comprise one or more computer-executable components which, when the program is run, are configured to carry out some example embodiments. The one or more computer-executable components may be at least one software code or portions of it. Modifications and configurations required for implementing functionality of an example embodiment may be performed as routine(s), which may be implemented as added or updated software routine(s). Software routine(s) may be downloaded into the apparatus.

As an example, software or a computer program code or portions of it may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10 or apparatus 20), for example through the use of an application specific integrated circuit (ASIC), a programmable gate array (PGA), a field programmable gate array (FPGA), or any other combination of hardware and software. In yet another example embodiment, the functionality may be implemented as a signal, a non-tangible means that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, including at least a memory for providing storage capacity used for arithmetic operation and an operation processor for executing the arithmetic operation.

One embodiment is directed to a method that may include, when a UE is not explicitly provided with a set of RS(s) to use for radio link monitoring and/or failure detection, and when a configured TCI state for PDCCH refers to aperiodic/semi-persistent RS, determining whether at least one periodical RS is included in the set of RS(s) for radio link monitoring and/or failure detection. If it is determined that at least one periodical RS is included in the set of RS(s) for radio link monitoring and/or failure detection, the method may include omitting the configured TCI state from the set of RS(s) for radio link monitoring and/or failure detection.

Another embodiment is directed to a method that may include, when a UE is not explicitly provided with a set of RS(s) to use for radio link monitoring and/or failure detection, and when a configured TCI state for PDCCH refers to aperiodic/semi-persistent RS, determining the QCL source RS used for configuring the aperiodic/semi-persistent RS. If the QCL source RS is periodic, the method may include using or including the QCL source RS in the set of RS(s) for radio link monitoring and/or failure detection. The method may also include, when the configured TCI state is de-activated, removing the QCL source RS from the set of RS(s) for radio link monitoring and/or failure detection.

Another embodiment is directed to an apparatus that may include at least one processor and at least one memory comprising computer program code. When the apparatus is not explicitly provided with a set of RS(s) to use for radio link monitoring and/or failure detection, and when a configured TCI state for PDCCH refers to aperiodic/semi-persistent RS, the at least one memory and computer program code may be configured, with the at least one processor, to cause the apparatus at least to determine whether at least one periodical RS is included in the set of RS(s) for radio link monitoring and/or failure detection. If it is determined that at least one periodical RS is included in the set of RS(s) for radio link monitoring and/or failure detection, the at least one memory and computer program code may be configured, with the at least one processor, to cause the apparatus at least to omit the configured TCI state from the set of RS(s) for radio link monitoring and/or failure detection.

Another embodiment is directed to an apparatus that may include at least one processor and at least one memory comprising computer program code. When the apparatus is not explicitly provided with a set of RS(s) to use for radio link monitoring and/or failure detection, and when a configured TCI state for PDCCH refers to aperiodic/semi-persistent RS, the at least one memory and computer program code may be configured, with the at least one processor, to cause the apparatus at least to determining the QCL source RS used for configuring the aperiodic/semi-persistent RS. If the QCL source RS is periodic, the at least one memory and computer program code may be configured, with the at least one processor, to cause the apparatus at least to use or include the QCL source RS in the set of RS(s) for radio link monitoring and/or failure detection. When the configured TCI state is de-activated, the at least one memory and computer program code may be configured, with the at least one processor, to cause the apparatus at least to remove the QCL source RS from the set of RS(s) for radio link monitoring and/or failure detection.

One having ordinary skill in the art will readily understand that the example embodiments as discussed above may be practiced with steps in a different order, and/or with hardware elements in configurations which are different than those which are disclosed. Therefore, although some embodiments have been described based upon these example preferred embodiments, it would be apparent to those of skill in the art that certain modifications, variations, and alternative constructions would be apparent, while remaining within the spirit and scope of example embodiments.

What is claimed is:

1. A method, comprising:
determining, by a user equipment, a quasi co-location source reference signal used for configuring an aperiodic or semi-persistent reference signal;
including the quasi co-location source reference signal in a set of reference signals to use for radio link monitoring or failure detection if the quasi co-location source reference signal is a periodic reference signal, the user equipment is not explicitly provided with the set of reference signals, and a configured transmission configuration index state for physical downlink control channel refers to the aperiodic or semi-persistent reference signal; and
omitting the configured transmission configuration index state from the set of reference signals if at least one periodic reference signal is already included in the set of reference signals.

2. The method as in claim 1, wherein the periodic reference signal is either a synchronization signal block or a channel state information reference signal.

3. The method as in claim 1, wherein the periodic reference signal is a synchronization signal block if the synchronization signal block is used as the quasi co-location source reference signal.

4. The method as in claim 1, wherein a synchronization signal block that is quasi co-located with the periodic reference signal is used by the user equipment.

5. The method as in claim 1, further comprising:
using the configured transmission configuration index state as part of the set of reference signals when the configured transmission configuration index state for physical downlink control channel refers to a periodic reference signal.

6. A method, comprising:
determining, by a user equipment, a quasi co-location source reference signal used for configuring an aperiodic or semi-persistent reference signal;
including the quasi co-location source reference signal in a set of reference signals to use for radio link monitoring or failure detection if the quasi co-location source reference signal is a periodic reference signal, the user equipment is not explicitly provided with the set of reference signals, and a configured transmission configuration index state for physical downlink control channel refers to the aperiodic or semi-persistent reference signal; and removing the quasi co-location source reference signal from the set of reference signals when the configured transmission configuration index state is de-activated.

7. An apparatus comprising:
at least one processor; and
at least one memory comprising computer program code,
the at least one memory and computer program code configured, with the at least one processor, to cause the apparatus at least to:
determine, a quasi co-location source reference signal used for configuring an aperiodic or semi-persistent reference signal;
include the quasi co-location source reference signal in a set of reference signals to use for radio link monitoring or failure detection if the quasi co-location source reference signal is a periodic reference signal, the apparatus is not explicitly provided with the set of reference signals, and a configured transmission configuration index state for physical downlink control channel refers to the aperiodic or semi-persistent reference signal; and
omit the configured transmission configuration index state from the set of reference signals if at least one periodic reference signal is already included in the set of reference signals.

8. The apparatus as in claim 7, wherein the periodic reference signal is either a synchronization signal block or a channel state information reference signal.

9. The apparatus as in claim 7, wherein the periodic reference signal is a synchronization signal block if the synchronization signal block is used as the quasi co-location source reference signal.

10. The apparatus as in claim 7, wherein a synchronization signal block that is quasi co-located with the periodic reference signal is used by the apparatus.

11. The apparatus as in claim 7, wherein the at least one memory and computer program instructions are further configured to, with the at least one processor, cause the apparatus at least to:
use the configured transmission configuration index state as part of the set of reference signals when the configured transmission configuration index state for physical downlink control channel refers to a periodic reference signal.

12. An apparatus comprising:
at least one processor; and
at least one memory comprising computer program code,
the at least one memory and computer program code configured, with the at least one processor, to cause the apparatus at least to:
determine, a quasi co-location source reference signal used for configuring an aperiodic or semi-persistent reference signal;
include the quasi co-location source reference signal in a set of reference signals to use for radio link monitoring or failure detection if the quasi co-location source reference signal is a periodic reference signal, the apparatus is not explicitly provided with the set of reference signals, and a configured transmission configuration index state for physical downlink control channel refers to the aperiodic or semi-persistent reference signal; and
remove the quasi co-location source reference signal from the set of reference signals when the configured transmission configuration index state is de-activated.

13. A non-transitory computer readable medium comprising program instructions stored thereon for performing at least the following:
determining a quasi co-location source reference signal used for configuring an aperiodic or semi-persistent reference signal;
including the quasi co-location source reference signal in a set of reference signals to use for radio link monitoring or failure detection if the quasi co-location source reference signal is a periodic reference signal, the non-transitory computer readable medium is not explicitly provided with the set of reference signals, and a configured transmission configuration index state for physical downlink control channel refers to the aperiodic or semi-persistent reference signal; and
omitting the configured transmission configuration index state from the set of reference signals if at least one periodic reference signal is already included in the set of reference signals.

14. The non-transitory computer readable medium of claim 13, wherein the periodic reference signal is either a synchronization signal block or a channel state information reference signal.

15. The non-transitory computer readable medium of claim 13, wherein the periodic reference signal is a synchronization signal block if the synchronization signal block is used as the quasi co-location source reference signal.

16. The non-transitory computer readable medium of claim 13, wherein a synchronization signal block that is quasi co-located with the periodic reference signal is used by the computer program product.

17. A non-transitory computer readable medium comprising program instructions stored thereon for performing at least the following:
determining a quasi co-location source reference signal used for configuring an aperiodic or semi-persistent reference signal;
including the quasi co-location source reference signal in a set of reference signals to use for radio link monitoring or failure detection if the quasi co-location source reference signal is a periodic reference signal, the non-transitory computer readable medium is not explicitly provided with the set of reference signals, and a configured transmission configuration index state for physical downlink control channel refers to the aperiodic or semi-persistent reference signal; and
removing the quasi co-location source reference signal from the set of reference signals when the configured transmission configuration index state is de-activated.

* * * * *